United States Patent
Beck et al.

(10) Patent No.: US 12,353,702 B2
(45) Date of Patent: Jul. 8, 2025

(54) PROJECTING INTERFACES ON A SURFACE

(71) Applicant: LENOVO (Singapore) PTE. LTD., New Tech Park (SG)

(72) Inventors: Kevin Wayne Beck, Raleigh, NC (US); Russell Speight VanBlon, Raleigh, NC (US); Thorsten P. Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/196,244

(22) Filed: Mar. 9, 2021

(65) Prior Publication Data

US 2022/0291795 A1    Sep. 15, 2022

(51) Int. Cl.
G06F 3/0487 (2013.01)
G06F 3/01 (2006.01)
H04N 9/31 (2006.01)

(52) U.S. Cl.
CPC .......... G06F 3/0487 (2013.01); G06F 3/013 (2013.01); H04N 9/31 (2013.01)

(58) Field of Classification Search
CPC .......... G06F 3/0487; G06F 3/013; H04N 9/31
See application file for complete search history.

(56) References Cited

U.S. PATENT DOCUMENTS

| | | | | |
|---|---|---|---|---|
| 6,592,228 B1 * | 7/2003 | Kawashima | ........... | G03B 21/11 353/69 |
| 8,807,757 B2 * | 8/2014 | Satake | ........... | G06F 3/017 353/30 |
| 11,106,314 B2 * | 8/2021 | Krishnakumar | ..... | G06F 3/04845 |
| 2009/0051827 A1 * | 2/2009 | Yokoyama | ........... | G03B 21/005 348/744 |
| 2009/0262098 A1 * | 10/2009 | Yamada | ........... | G06F 1/169 345/175 |
| 2012/0075708 A1 * | 3/2012 | Hagiwara | ........... | B60K 35/233 359/630 |
| 2012/0236038 A1 * | 9/2012 | Cudak | ........... | G06T 3/40 345/667 |
| 2013/0145438 A1 * | 6/2013 | Choi | ........... | H04M 1/72463 726/4 |
| 2015/0109261 A1 * | 4/2015 | Masuda | ........... | G06F 3/04886 345/175 |
| 2015/0268730 A1 * | 9/2015 | Walline | ........... | G06F 3/0393 345/173 |
| 2016/0316186 A1 * | 10/2016 | Krishnakumar | .... | G06F 3/03547 |
| 2017/0031530 A1 * | 2/2017 | Ikeda | ........... | H04N 5/74 |
| 2018/0262730 A1 * | 9/2018 | Kim | ........... | G06F 3/0425 |
| 2019/0121522 A1 * | 4/2019 | Davis | ........... | G02B 27/017 |
| 2019/0191134 A1 * | 6/2019 | Urano | ........... | H04N 9/3147 |

(Continued)

*Primary Examiner* — William Boddie
*Assistant Examiner* — Bipin Gyawali
(74) *Attorney, Agent, or Firm* — Kunzler Bean & Adamson (57) ABSTRACT

Apparatuses, methods, systems, and program products are disclosed for projecting interfaces on a surface. An apparatus includes a processor and a memory that stores code executable by the processor. The code is executable by the processor to scan a surface around a display device connected to an electronic device, determine a usable area of the scanned surface for projecting at least one graphical interface of the electronic device, and project the determined at least one graphical interface on the usable area of the scanned surface using at least one projector.

20 Claims, 7 Drawing Sheets

(56) References Cited

U.S. PATENT DOCUMENTS

| | | | | |
|---|---|---|---|---|
| 2019/0351319 A1* | 11/2019 | Kuji | .................. | A63F 13/25 |
| 2021/0097286 A1* | 4/2021 | Lehrich | .................. | G06F 3/017 |
| 2022/0291795 A1* | 9/2022 | Beck | .................. | G06F 3/04815 |
| 2022/0295028 A1* | 9/2022 | Masuda | .................. | H04N 9/3194 |

* cited by examiner

PROJECTING INTERFACES ON A SURFACE

FIELD

The subject matter disclosed herein relates to graphical user interfaces and more particularly relates to projecting interfaces on a surface around a display.

BACKGROUND

Display devices are used to present graphical information to a user, such as an application executing on a device. Display devices have limited dimensions for presenting the graphical information.

BRIEF SUMMARY

Apparatuses, methods, systems, and program products are disclosed for projecting interfaces on a surface. An apparatus, in one embodiment includes a processor and a memory that stores code executable by the processor. In one embodiment, the code is executable by the processor to scan a surface around a display device connected to an electronic device, determine a usable area of the scanned surface for projecting at least one graphical interface of the electronic device, and project the determined at least one graphical interface on the usable area of the scanned surface using at least one projector.

A system for projecting interfaces on a surface, in one embodiment, includes a computing device comprising a processor and memory, a display device connected to the computing device, and at least one projector coupled to the display device and operably connected to the computing device. In further embodiments, the memory stores code that is executable by the processor to scan a surface around a display device connected to an electronic device, determine a usable area of the scanned surface for projecting at least one graphical interface of the electronic device, and project the determined at least one graphical interface on the usable area of the scanned surface using at least one projector.

A method for projecting interfaces on a surface, in one embodiment, includes scanning, by a processor a surface around a display device connected to an electronic device, determining a usable area of the scanned surface for projecting at least one graphical interface of the electronic device, and projecting the determined at least one graphical interface on the usable area of the scanned surface using at least one projector.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatuses, methods, systems, and program products are disclosed for projecting interfaces on a surface. An apparatus, in one embodiment includes a processor and a memory that stores code executable by the processor. In one embodiment, the code is executable by the processor to scan a surface around a display device connected to an electronic device, determine a usable area of the scanned surface for projecting at least one graphical interface of the electronic device, and project the determined at least one graphical interface on the usable area of the scanned surface using at least one projector.

In one embodiment, the at least one projector is integrated with the display device and automatically adjustable based on sensor data for projecting the at least one graphical interface on the usable area of the scanned surface. In some embodiments, the code is executable by the processor to determine one of a size and a dimension of the usable area of the scanned surface based on the scan of the surface.

In one embodiment, the code is executable by the processor to identify at least one object within the usable area of the scanned surface and provide suggestions for one or more of moving the at least one identified object from the usable area of the scanned surface and adjusting a position of the display device.

In one embodiment, the at least one object comprises a peripheral device connected to a port of the electronic device and the suggestions comprise a different port of the electronic device to connect the peripheral device to such that the peripheral device is not within the usable area of the scanned surface.

In one embodiment, the code is executable by the processor to adjust a display setting of the projected at least one graphical interface based on sensor data. In some embodiments, the sensor data comprises telemetry data from at least one of an accelerometer, a gyroscope, and a hinge position sensor. In one embodiment, the sensor data comprises characteristics of the usable area of the scanned surface and the display setting of the projected at least one graphical interface may be adjusted based on the characteristics of the usable surface.

In one embodiment, the code is executable by the processor to identify at least one graphical interface presented on the display device that is suitable to be projected onto the usable area of the scanned surface. In some embodiments, at least one graphical interface is suitable to be projected on the usable area of the scanned surface based on security settings for content presented within the graphical interface.

In certain embodiments, the at least one graphical interface is suitable to be projected on the usable area of the scanned surface based on an amount of user attention the graphical interface involves. In one embodiment, the at least one graphical interface is suitable to be projected on the usable area of the scanned surface based on a user preference that designates content presented within the graphical interface is to be projected on the usable surface.

In one embodiment, the designated content comprises at least one of calendar information, meeting information, toasts, email notifications, push notifications, and system updates. In some embodiments, the at least one graphical interface is suitable to be projected on the usable area in response to the at least one graphical interface displaying text-based content that has a number of characters below a threshold.

In various embodiments, the at least one graphical interface is suitable to be projected on the usable area in response to a size and dimension of the at least one graphical interface corresponding to a size and dimension of the usable area of the scanned surface. In some embodiments, the code is executable by the processor to track a user's eye gaze, determine that the user is looking at an area on the surface around the display device, and enable projection of the at least one graphical interface on the usable area of the scanned surface where the user is looking.

In one embodiment, the code is executable by the processor to prompt a user for confirmation to project the at least one graphical interface onto the usable area of the scanned surface.

A system for projecting interfaces on a surface, in one embodiment, includes a computing device comprising a processor and memory, a display device connected to the computing device, and at least one projector coupled to the display device and operably connected to the computing device. In further embodiments, the memory stores code that is executable by the processor to scan a surface around a display device connected to an electronic device, determine a usable area of the scanned surface for projecting at least one graphical interface of the electronic device, and project the determined at least one graphical interface on the usable area of the scanned surface using at least one projector.

In one embodiment, the at least one projector is integrated with the display device and automatically adjustable based on sensor data for projecting the at least one graphical interface on the usable area of the scanned surface.

A method for projecting interfaces on a surface, in one embodiment, includes scanning, by a processor a surface around a display device connected to an electronic device, determining a usable area of the scanned surface for projecting at least one graphical interface of the electronic device, and projecting the determined at least one graphical interface on the usable area of the scanned surface using at least one projector.

Figure 1:
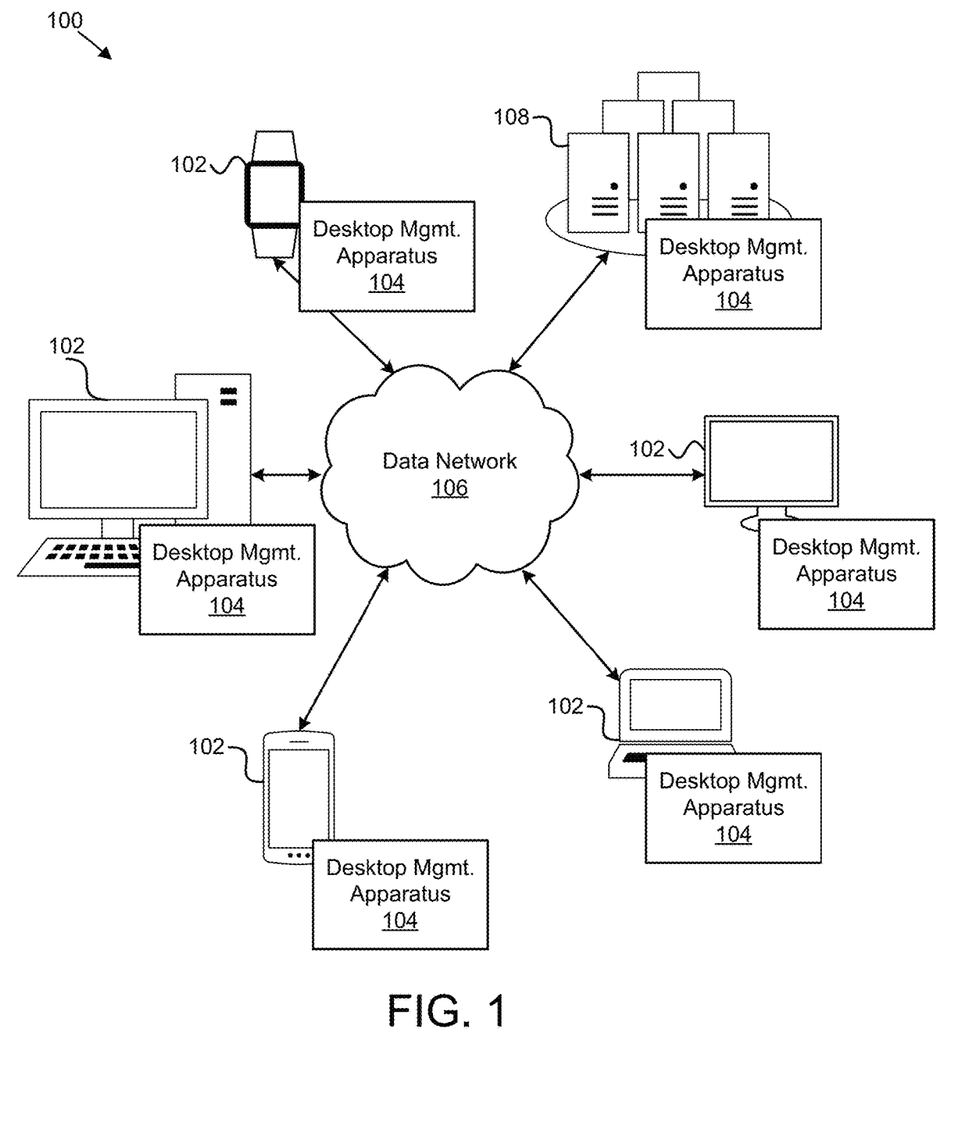
FIG. 1 is a schematic block diagram illustrating one embodiment of a system for projecting interfaces on a surface.

FIG. 1 is a schematic block diagram illustrating one embodiment of a system 100 for projecting interfaces on a surface. In one embodiment, the system 100 includes one or more information handling devices 102, one or more desktop management apparatuses 104, one or more data networks 106, and one or more servers 108. In certain embodiments, even though a specific number of information handling devices 102, desktop management apparatuses 104, data networks 106, and servers 108 are depicted in FIG. 1, one of skill in the art will recognize, in light of this disclosure, that any number of information handling devices 102, desktop management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the desktop management apparatus 104 is configured to extend a user's graphical desktop area, e.g., a Windows® desktop, an Apple® desktop, a Linux® desktop, or the like, onto a physical or tangible surface, e.g., a physical desktop surface, a wall, and/or the like, using projectors, e.g., micro-projectors or pico-projectors that are built into a device, e.g., a laptop, a display, e.g., a monitor, and/or the like that is presenting the graphical desktop. In one embodiment, the desktop management apparatus 104 is configured to scan a surface around a display device connected to an electronic device, determine a usable area of the scanned surface for projecting at least one graphical interface of the electronic device, and project the determined at least one graphical interface on the usable area of the scanned surface using at least one projector. The desktop management apparatus 104 is described in more detail below with reference to FIG. 2.

In certain embodiments, the desktop management apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the desktop management apparatus 104 may include a power interface, a wired and/or wireless network interface, a graphical interface that attaches to a display, and/or a semiconductor integrated circuit device as described below, configured to perform the functions described herein with regard to the desktop management apparatus 104.

The desktop management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the desktop management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the desktop management apparatus 104.

The semiconductor integrated circuit device or other hardware appliance of the desktop management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the desktop management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
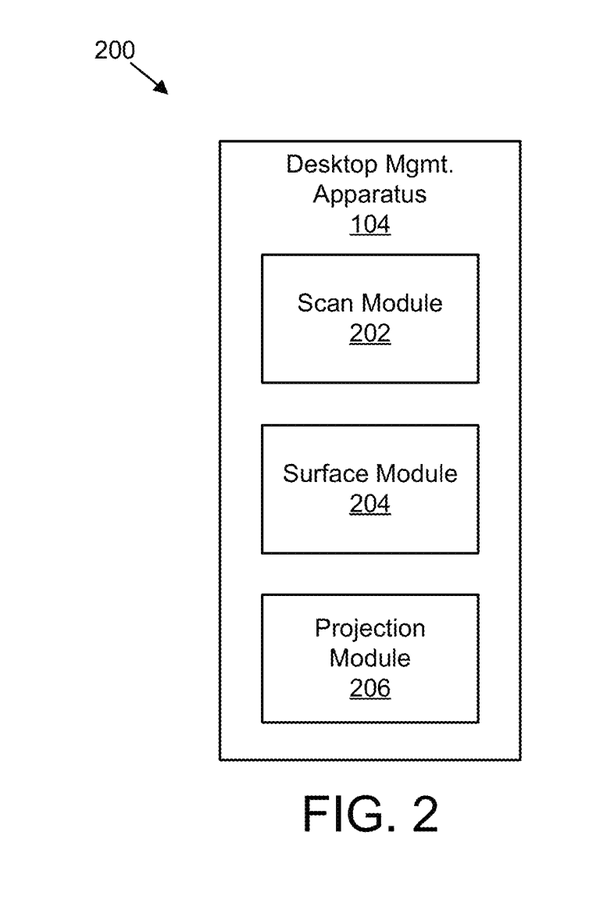
FIG. 2 is a schematic block diagram illustrating one embodiment of an apparatus for projecting interfaces on a surface.

FIG. 2 is a schematic block diagram illustrating one embodiment of an apparatus 200 for projecting interfaces on a surface. In one embodiment, the apparatus 200 includes an instance of a desktop management apparatus 104. In one embodiment, the desktop management apparatus 104 includes one or more of a scan module 202, a surface module 204, and a projection module 206, which are described in more detail below.

In one embodiment, the scan module 202 is configured to scan a surface around a display device connected to an electronic device. The scan module 202, for instance, may use cameras or other imaging devices connected to, integrated with, or otherwise associated with the display device to capture images or video of the area around the display device, e.g., a desktop area, an area on a wall, or the like. For example, the scan module 202 may use a front-facing camera, a world-facing camera, a web-cam, a camera of a different device (e.g., a smart phone camera), and/or the like to capture images or videos of the area around a display. As explained above, the display may be a stand-alone monitor, a display built into a device, e.g., a laptop display, and/or the like.

In one embodiment, the surface module 204 is configured to determine a usable area of the scanned surface for projecting at least one graphical interface of the electronic device. As used herein, a usable area of the scanned surface may refer to an area of the surface that is free of obstructions or other impediments that would hinder a projection of a graphical interface onto the surface (e.g., that would distort or make unclear/unusable the graphical interface). The surface module 204, for instance, may process the images/videos that the scan module 202 captures to process a surface including identifying objects, items, or the like that might obstruct a usable area for projecting an interface; identifying colors, textures, and/or the like of the surface; and/or the like.

In one embodiment, the surface module 204 is configured to determine a size, a dimension, a shape, and/or the like of the usable area of the scanned surface. For instance, the surface module 204 may determine that an area of the desktop adjacent to a monitor is free of objects, has a rectangular shape (e.g., between the monitor and the edges of the desk), has a light brown color, and has an area that is roughly one foot by two feet. If the surface has objects sitting on it, e.g., a cup, pencil, computer mouse, papers, or the like, the surface module 204 may determine a shape of the usable area around the objects sitting on the surface.

In one embodiment, the surface module 204 may determine coordinates, units, or the like for the dimensions of the usable area for calibrating or configuring the projector. In certain embodiments, the surface module 204 may project an outline on the surface of the usable area of the surface for the user to see and/or may present an on-screen representation of the usable area.

In one embodiment, the projection module 206 is configured to project the determined at least one graphical interface on the usable area of the scanned surface using at least one projector. As described above, the projector may be a micro-projector or a pico-projector that is built or integrated into the display, e.g., into a bezel of the display, or is otherwise coupled to the display, or the like, and that is capable of projecting a graphical interface onto the determined usable area of the surface, e.g., to create a 360° interactive workspace around the display.

In certain embodiments, the projection module 206 is configured to automatically adjust various mechanical settings of the projector, including a focus setting, a zoom settings, a resolution settings, an angle or other position, and/or the like. For instance, in such an embodiment, a micro-projector that is integrated into a display may be positioned on a gimbal or other swivel mechanism that allows the projection module 206 to trigger, signal, command, or the like the micro-projector to move up/down, left/right, or the like, e.g., signal a motor coupled to the projector, depending on the surface that the graphical interface is being projected onto, as the surface module 204 determines. The projection module 206 may use sensor data to adjust a position of the micro-projector, e.g., image data from a camera, infrared data from an IR camera, light sensor data, proximity sensor data, and/or the like, to determine a position for the micro-projector.

Figure 3:
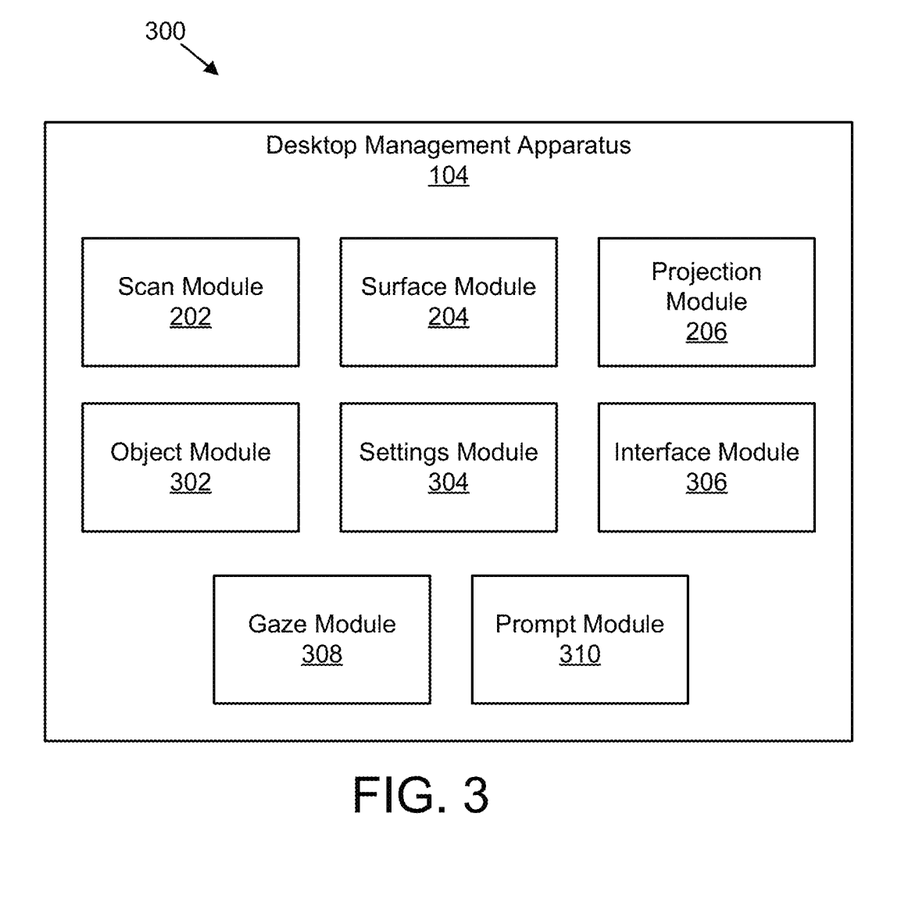
FIG. 3 is a schematic block diagram illustrating one embodiment of another apparatus for projecting interfaces on a surface.

FIG. 3 is a schematic block diagram illustrating one embodiment of another apparatus 300 for projecting interfaces on a surface. In one embodiment, the apparatus 300 includes an instance of a desktop management apparatus 104. In one embodiment, the desktop management apparatus 104 includes one or more of a scan module 202, a surface module 204, and a projection module 206, which may be substantially similar to the scan module 202, the surface module 204, and the projection module 206 described above with reference to FIG. 2. The desktop management apparatus 104 may further include an object module 302, a settings module 304, an interface module 306, a gaze module 308, and a prompt module 310, which are described in more detail below.

In one embodiment, the object module 302 is configured to identify at least one object within the usable area of the scanned surface. The object module 302, for instance, may use image processing algorithms such as edge detection on the images that the scan module 202 captures to identify objects that are located on the surface. The object module 302 may provide information about the identified objects to an image database, a machine learning, a third-party system, or the like to determine what the identified object is, e.g., to determine that the identified object is a mug, a pen, a computer mouse, a document, and/or the like.

In response to identifying the objects, the object module 302 may provide suggestions for moving the identified objects so that they are no longer in the usable area of the surface. For instance, the object module 302 may provide an audio message or textual message that suggests that the user move the mug on the left side of the display two inches to the left and a computer mouse on the right side of the display five inches to the right. The suggestions may also include suggestions for adjusting a position of the display device in order to avoid the objects in the usable area of the surface, e.g., move the monitor three inches to the right.

In another example embodiment, an identified object may include a peripheral device connected to a port of the electronic device. For instance, the object module 302 may identify a mouse that is connected to a USB port on a right side of a laptop. In such an embodiment, the suggestions may include a different port of the electronic device to connect the peripheral device to such that the peripheral device is not within the usable area of the scanned surface, e.g., connecting the mouse to a USB port on the left side of the display so that the surface on the right side of the display is usable.

In one embodiment, the settings module 304 is configured to adjust a display setting of the projected at least one graphical interface based on sensor data. The display setting, for instance, may include a brightness setting, a resolution setting, a zoom setting, a focus setting, a contrast or sharpness setting, and/or the like. The sensor data may include telemetry data from at least one of an accelerometer, a gyroscope, a hinge position sensor, and/or the like. Based on the telemetry data, e.g., based on a position of a laptop display according to hinge sensor data, the settings module 304 can determine a distance, angle, or the like from the projector to the surface and provide instructions or commands for adjusting the various settings to correct the size or perspective such that the image projected onto the surface is clear, readable, legible, or otherwise usable.

In one embodiment, the interface module 306 is configured to identify at least one graphical interface presented on the display device that is suitable to be projected onto the usable area of the scanned surface. As used herein, a graphical interface may comprise a graphical window for an application, a pop-up window, a chat window, and/or the like that is used as part of a graphical desktop or mobile environment. Examples may include a window for a Microsoft Word® document, a window for a web browser, a window for a chat program, a window for a push notification, a window for a calendar, a window for a contacts list, and so on.

In one embodiment, the interface module 306 determines that a graphical interface is suitable to be projected on the usable area of the scanned surface based on security settings for content presented within the graphical interface. For instance, if the content within the interface is a document that requires a certain security or clearance level, or other permissions, to view, the interface module 306 may determine that the document should not be projected onto the surface because it may be exposed to people who do not have the required clearance level. On the other hand, if an interface includes content that is publicly available or is otherwise not secret or confidential, then the interface module 306 may select the interface for projection on the surface.

In one embodiment, the interface module 306 determines that a graphical interface is suitable to be projected on the usable area of the scanned surface based on an amount of user attention the graphical interface involves. For instance, if the user constantly or consistently looks at their calendar or contact list or email list or the like, the interface module 306 may select such an interface to be projected on the surface so that it is viewable for the user without requiring the user to make context switch on the display.

In one embodiment, the interface module 306 determines that a graphical interface is suitable to be projected on the usable area of the scanned surface based on a user preference that designates content presented within the graphical interface is to be projected on the usable surface. For instance, the user may specify that their email list always be projected, if available. Or, that their calendar always be projected on the surface. In another embodiment, the user may specify that all pop-ups or notifications (or notifications from particular applications or of certain types) be projected on the surface. Thus, as examples, the designated content that a user may specify should be projected on the surface may include calendar information, meeting information, toasts, email notifications, push notifications, system updates, and/or the like.

In one embodiment, the interface module 306 determines that a graphical interface is suitable to be projected on the usable area in response to the at least one graphical interface displaying text-based content that has a number of characters below a threshold. In certain embodiments, the usable area of the surface may not be large enough to clearly display certain interfaces such as web browsers, images, videos, large documents, or the like. Thus, the interface module 306 determines whether an interface includes content that is small enough to fit in the usable area, such as text content that has a number of characters that is less than a threshold, e.g., 150 characters; image content that has dimensions that fit within the usable area; and/or the like.

Thus, if an interface would have to be resized such that content within the interface would be cutoff or not visible, then the interface module 306 may determine that the interface is not suitable to be projected on the usable area. In other words, the interface module 306 determines that a graphical interface is suitable to be projected on the usable area in response to a size and dimension of the graphical interface corresponding to, e.g., fitting within, a size and dimension of the usable area of the scanned surface.

In one embodiment, the gaze module 308 is configured to track a user's eye gaze using an eye gaze sensor such as a camera, video camera, and/or the like and processing the images/video using image processing algorithms to determine a direction that the user is looking relative to the display. Other actions, object, and/or body parts may be tracked/monitored including the user's hands (e.g., hands move towards the usable area of the surface), a gesture (e.g., a face or hand gesture to move an interface to the usable area of the surface), a smart pen, and/or the like to trigger moving an interface for the current application or a pre-selected application associated with the movement/gesture to the usable area of the display.

In such an embodiment, the gaze module 308 determines whether the user is looking at an area on the surface around the display device, e.g., based on the angle of the user's eye gaze relative to the display. If so, then the gaze module 308 may enable, trigger, signal, instruct, or the like projection of the at least one graphical interface on the usable area of the scanned surface, e.g., a desktop, where the user is looking.

In one embodiment, the prompt module 310 is configured to prompt a user for confirmation to project the at least one graphical interface onto the usable area of the scanned surface. For instance, the prompt module 310 may prompt a user using a pop-up window or other push notification to suggest moving one or more windows to be projected onto the usable area of the surface, may confirm moving an interface to be projected onto the usable area of the surface, may receive input from the user to always project a particular window or interface onto the usable area of the surface, and/or the like.

Figure 4:
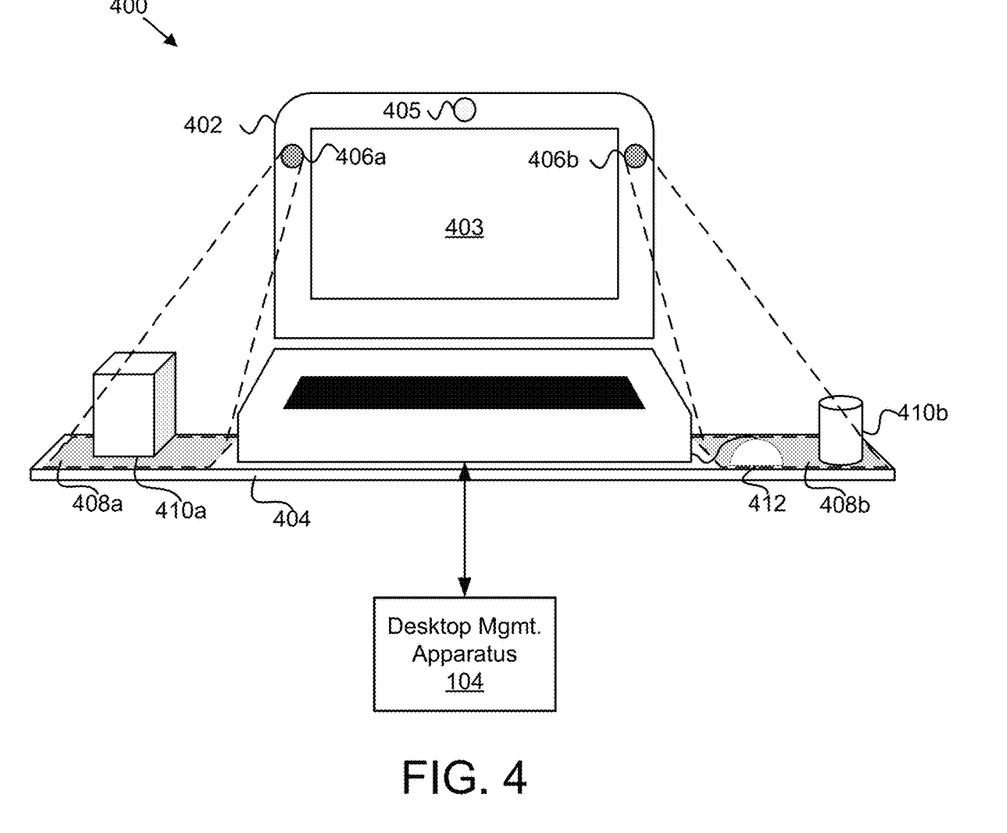
FIG. 4 is a schematic block diagram illustrating one example embodiment of a system for projecting interfaces on a surface.

FIG. 4 depicts one example embodiment of a system 400 projecting interfaces on a surface. As shown in the example embodiment, the system 400 includes an electronic device 402, e.g., a laptop computer, that includes a display 403. The laptop computer 402 may be sitting on a surface 404, such as a counter, a desktop, a table, or the like. The laptop computer 402 may include one or more projectors 406*a-b* (collectively 406), which may be micro-projectors that are built into or integrated with the display 403 portion of the laptop computer 402, e.g., located within the bezel of the display 403. In other embodiments, the projectors 406 may be separate devices that are couplable onto the display 403, or the like.

In further embodiments, a desktop management apparatus 104 located on the laptop computer 402 may scan areas around 408*a-b* (collectively 408) to determine usable areas of the surface 404 where graphical interfaces can be projected to extend the usable area of the display. In such an embodiment, the desktop management apparatus 104, e.g., the scan module 202, may use a camera 405, or multiple cameras 405, to capture images of the areas of the surface around the laptop computer 402. Other sensors may be used such as LIDAR cameras, IR cameras, and/or the like.

The desktop management apparatus 104, e.g., the surface module 304, may determine a usable area 408 of the surface 404 for projecting a graphical interface onto the surface 404. In such an embodiment, the desktop management apparatus 104, e.g., the surface module 304 projects an outline, color, highlight, blinking lights, light gradient, and/or the like of the usable area 408 of the surface 404 onto the surface 404 so that the user can visually see the usable area 408 of the surface 404 and adjust, as necessary.

In one embodiment, the desktop management apparatus 104, e.g., the object module 302, may identify objects 410a-b (collectively 410) that are located within the usable area 408 of the surface 404. Furthermore, the desktop management apparatus 104, e.g., the object module 302 may identify computer peripheral components on the surface 404 that are connected to the laptop computer, e.g., a mouse 412. The desktop management apparatus 104, e.g., the object module 302 may create and present suggestions for moving the various objects out of or away from the usable area 408 of the surface 404.

In one embodiment, the desktop management apparatus 104, e.g., the projection module 206 projects a graphical interface on the usable area 408 of the surface 404 using at least one projector 406. In some embodiments, a user may interact with an interface projected onto the usable area 408 of the surface 404, e.g., by "touching" graphical elements presented on the usable area 408 of the surface 404, which may be enabled using LIDAR sensors or other human-computer interaction sensors. In such an embodiment, the projectors 406 may include laser projectors. The desktop management apparatus 104 may detect and/or receive the user input on the interface projected onto the usable area 408 of the surface 404 for processing at the laptop computer 402.

Figure 5:
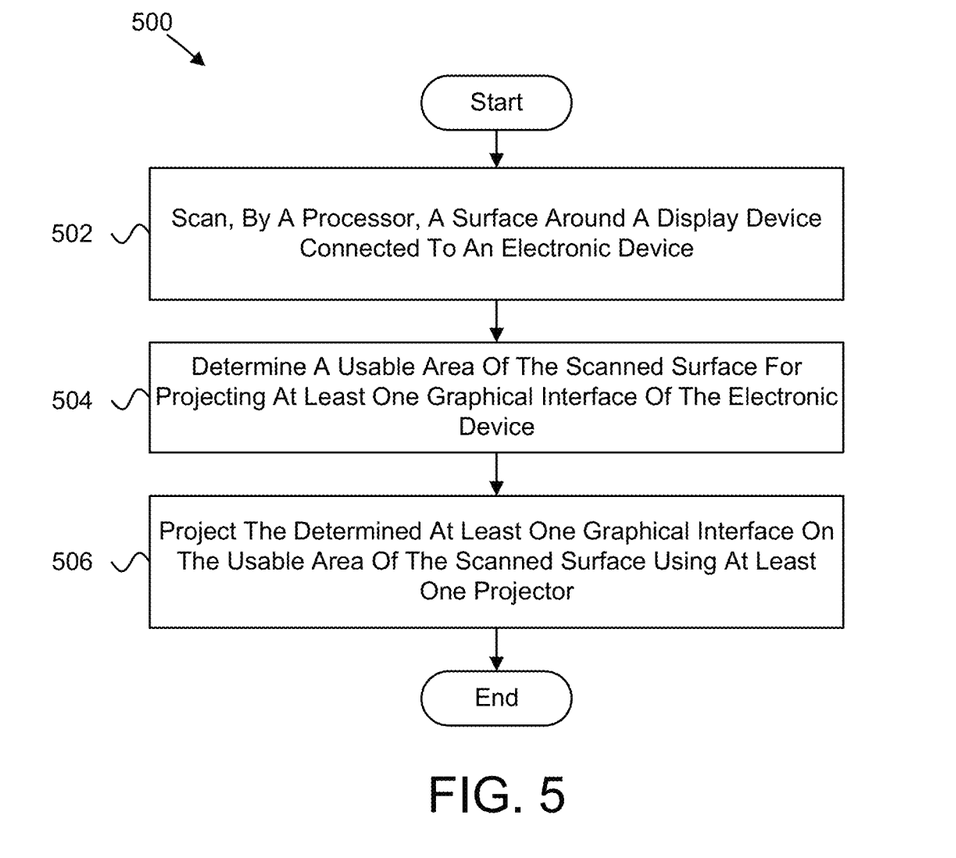
FIG. 5 is a schematic flow chart diagram illustrating one embodiment of a method for projecting interfaces on a surface.

FIG. 5 is a schematic flow chart diagram illustrating one embodiment of a method 500 for projecting interfaces on a surface. In one embodiment, the method 500 begins and scans 502 a surface around a display device connected to an electronic device. In some embodiments, the method 500 determines 504 a usable area of the scanned surface for projecting at least one graphical interface of the electronic device. The method 500, in further embodiments, projects 506 the determined at least one graphical interface on the usable area of the scanned surface using at least one projector, and the method 500 ends. In various embodiments, the scan module 202, the surface module 204, and the projection module 206 perform the various steps of the method 500.

Figure 6:
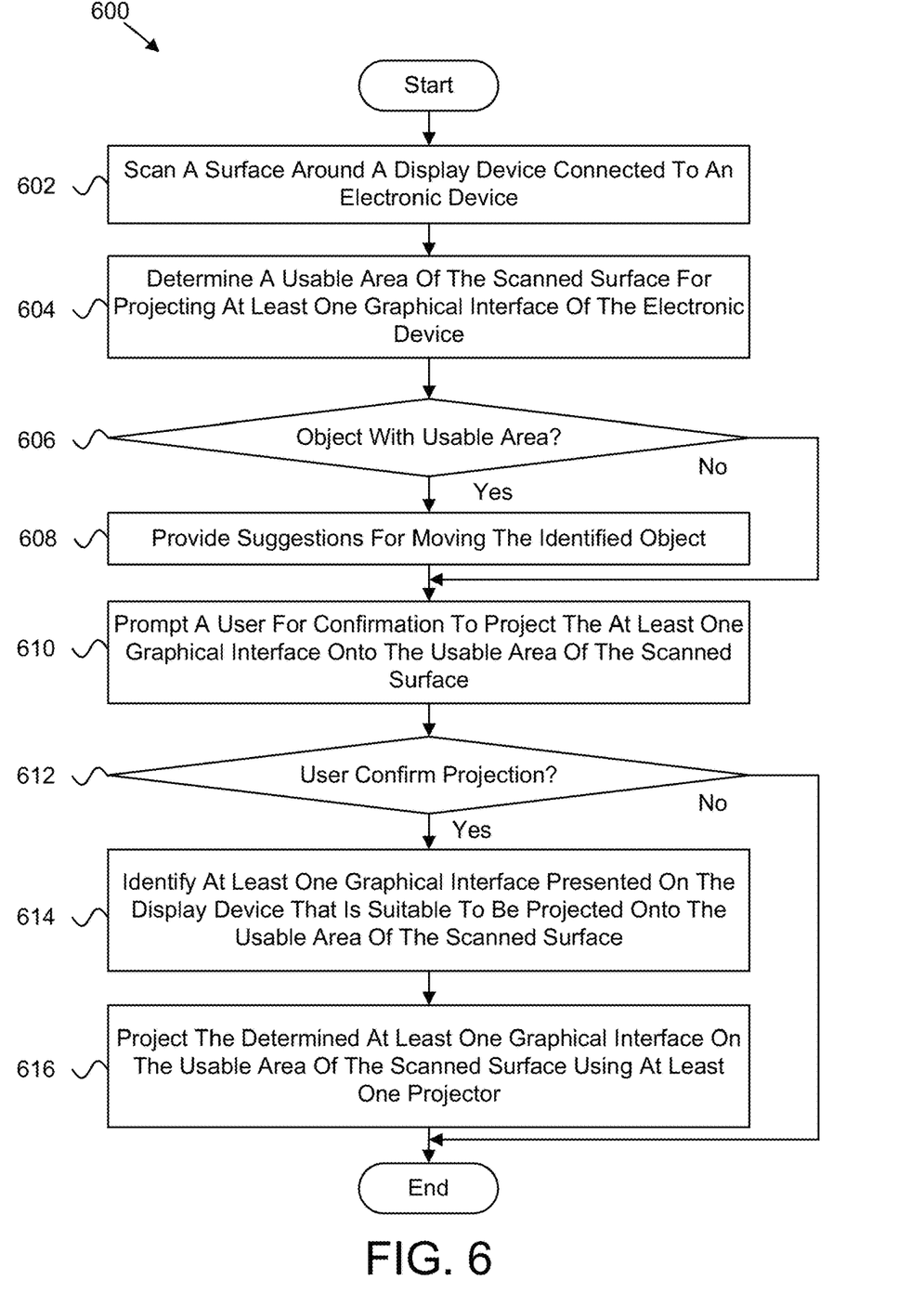
FIG. 6 is a schematic flow chart diagram illustrating one embodiment of a method for projecting interfaces on a surface.

FIG. 6 is a schematic flow chart diagram illustrating one embodiment of a method 600 for projecting interfaces on a surface. In one embodiment, the method 600 begins and scans 602 a surface around a display device connected to an electronic device. In some embodiments, the method 600 determines 604 a usable area of the scanned surface for projecting at least one graphical interface of the electronic device.

In one embodiment, the method 600 determines 606 whether there are objects within the usable area of the surface. If so, the method 600 provides 608 suggestions for moving the identified objects away from or out of the usable area of the surface. The method 600, in one embodiment, prompts 610 a user for confirmation to project the at least one graphical interface onto the usable area of the scanned surface.

In some embodiments, the method 600 determines 612 whether the user confirmed the projection. If not, the method 600 ends. Otherwise, the method 600 identifies 614 at least one graphical interface presented on the display device that is suitable to be projected onto the usable area of the scanned surface. In further embodiments, the method 600 projects 616 the determined at least one graphical interface on the usable area of the scanned surface using at least one projector, and the method 600 ends. In various embodiments, the scan module 202, the surface module 204, the projection module 206, the object module 302, and the prompt module 310 perform the various steps of the method 600.

Figure 7:
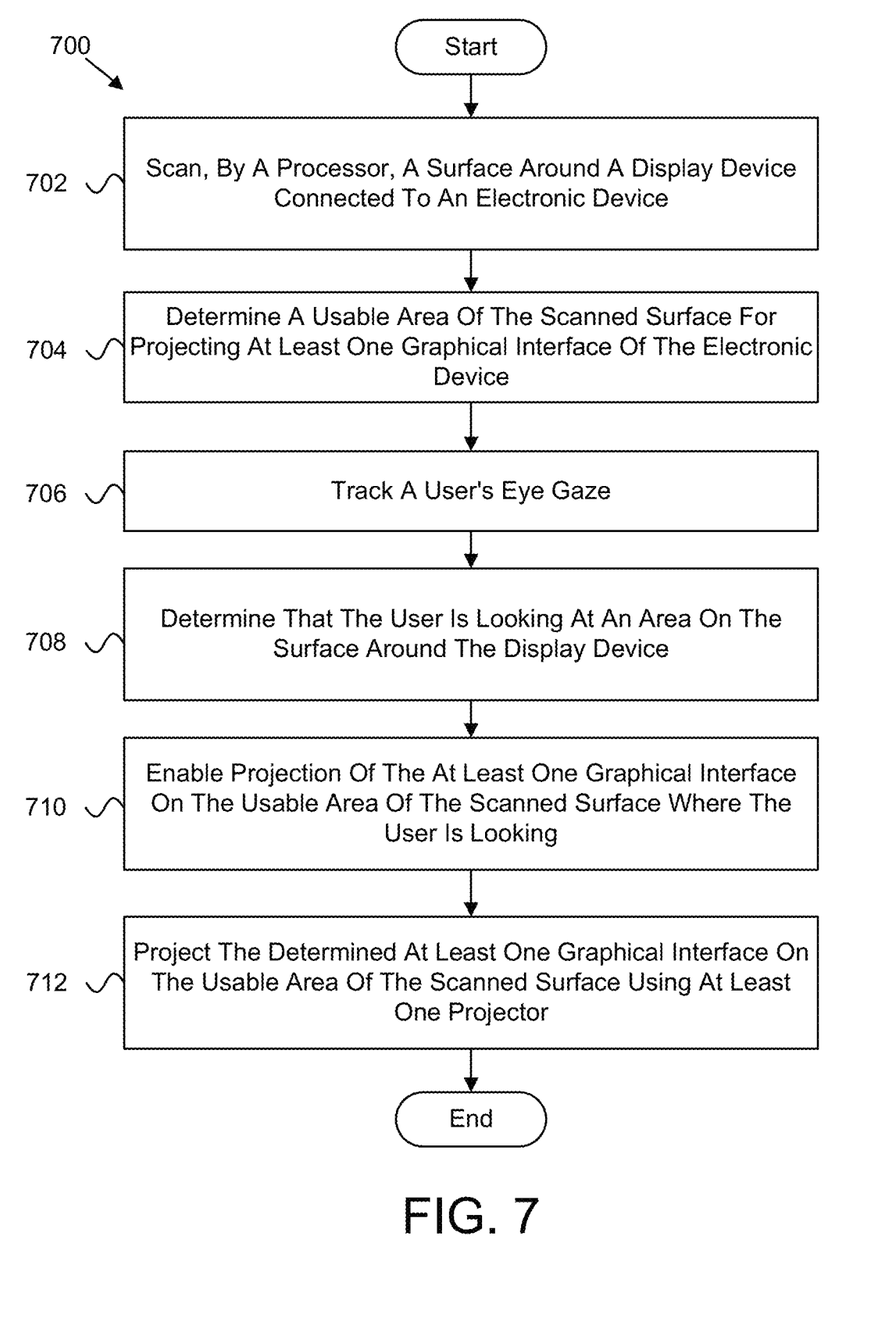
FIG. 7 is a schematic flow chart diagram illustrating one embodiment of another method for projecting interfaces on a surface.

FIG. 7 is a schematic flow chart diagram illustrating one embodiment of a method 700 for projecting interfaces on a surface. In one embodiment, the method 700 begins and scans 702 a surface around a display device connected to an electronic device. In some embodiments, the method 700 determines 704 a usable area of the scanned surface for projecting at least one graphical interface of the electronic device.

In some embodiments, the method 700 tracks 706 a use's eye gaze and determines 708 that the user is looking at an area on the surface around the display. In one embodiment, the method 700 enables 710 projection of the at least one graphical interface on the usable area of the scanned surface where the user is looking. In further embodiments, the method 700 projects 712 the determined at least one graphical interface on the usable area of the scanned surface using the at least one projector, and the method 700 ends. In various embodiments, the scan module 202, the surface module 204, the projection module 206, and the gaze module 308 perform the various steps of the method 700.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor of a laptop computing device, the laptop computing device comprising an integrated display device, an integrated camera, and at least one projector integrated in the display device; and
   a memory that stores code executable by the processor to:
      track, via the integrated camera, a gaze of a user to identify where the user is looking relative to the display device;
      using the tracked gaze to identify a surface around at least one of the integrated display device and the laptop computing device where the user is looking and upon which the at least one of the integrated display device and the laptop computing device is positioned to determine an area of the identified surface for projecting, directly from the at least one integrated projector of the laptop computing device, at least one graphical interface of the laptop computing device;
      determine whether the at least one graphical interface is suitable for projection onto the area of the identified surface;
      determine whether the area of the identified surface is suitable for hosting a functionality of the at least one graphical interface so that the user is able to interact and use the at least one graphical interface thereon;

in response to determining that the at least one graphical interface is suitable for projection onto the area of the identified surface and that the identified surface is suitable for hosting the user interactions with the at least one graphical interface and allows the user to interact and use the at least one graphical interface thereon, determine that the area is a usable area for the at least one graphical interface;

in response to determining that the area is the usable area for the at least one graphical interface, project an indication of the usable area on to the identified surface so that the user can visually see the usable area on the identified surface prior to the at least one graphical interface being projected thereon;

adjust the usable area on the identified surface in response to receiving an adjustment input from the user, wherein adjusting the usable area includes adjusting a visual size and functional size of the at least one graphical interface; and project the at least one graphical interface on to the usable area of the identified surface in response to receiving an acceptance input from the user, wherein the adjustment is performed subsequent to projecting the indication of the usable area onto the identified surface and prior to receiving the acceptance input from the user.

2. The apparatus of claim 1, wherein the at least one integrated projector is automatically adjustable based on sensor data for projecting the at least one graphical interface on the usable area of the identified surface.

3. The apparatus of claim 1, wherein the code is executable by the processor to, in further response to determining that the at least one graphical interface fits within the usable area of the identified surface, prompt the user for confirmation to project the at least one graphical interface onto the usable area of the identified surface for use thereon.

4. The apparatus of claim 1, wherein the usable area of the identified surface around the at least one of the display device and the laptop computing device is identified based on the angle of the user's gaze relative to the laptop computing device.

5. The apparatus of claim 1, wherein:
the laptop computing device comprises a plurality of integrated projectors in which at least one projector is within a bezel of the display device; and
the plurality of integrated projectors are configured to project, directly from the plurality of integrated projectors, the at least one graphical interface of the laptop computing device to the usable area of the identified surface for use thereon.

6. The apparatus of claim 1, wherein the code is executable by the processor to:
determine whether the usable area of the identified surface includes at least one real-world physical object located within the usable area of the identified surface; and
in response to the usable area of the identified surface including at least one real-world physical object located therein, transmit, via the integrated projector, a message to a user providing at least one suggestion for moving each real-world physical object located within the usable area of the identified surface to free the usable area of the identified surface of real-world physical objects so that the at least one graphical interface can be projected directly from the at least one integrated projector to an object-free usable area of the identified surface.

7. The apparatus of claim 6, wherein:
the code is executable by the processor to identify a type of object for each real-world physical object within the usable area of the identified surface; and
the message further provides at least one suggestion for adjusting a position of at least one of the integrated display device and the laptop computing device.

8. The apparatus of claim 6, wherein:
the laptop computing device comprises a plurality of ports;
the at least one real-world physical object comprises a peripheral device connected to a first port of the laptop computing device; and
the message comprises at least one suggestion for connecting the peripheral device to a second port of the laptop computing device to connect the peripheral device such that the peripheral device is not within the usable area of the identified surface.

9. The apparatus of claim 1, wherein the code is executable by the processor to adjust a display setting of the projected at least one graphical interface based on sensor data.

10. The apparatus of claim 9, wherein:
the laptop computing device further comprises at least one of an accelerometer, a gyroscope, and a hinge position sensor; and
the sensor data comprises telemetry data from at least one of the accelerometer, the gyroscope, and the hinge position sensor.

11. The apparatus of claim 9, wherein the sensor data comprises characteristics of the usable area of the identified surface and the display setting of the projected at least one graphical interface is adjusted based on the characteristics of the usable surface.

12. The apparatus of claim 1, wherein the code is executable by the processor to identify at least one graphical interface presented on the integrated display device that fits within the usable area of the identified surface for use thereon.

13. The apparatus of claim 12, wherein the identified at least one graphical interface is further suitable to be projected on the usable area of the identified surface in further response to the identified at least one graphical interface displaying text-based content that has a number of characters below a threshold quantity.

14. The apparatus of claim 12, wherein the identified at least one graphical interface is further suitable to be projected on the usable area of the identified surface in further response to a dimension of the identified at least one graphical interface corresponding to a dimension of the usable area of the identified surface.

15. The apparatus of claim 12, wherein the code is further executable by the processor to:
determine a security setting for content presented within the identified at least one graphical interface that fits within the usable area of the identified surface;
in response to the security setting of the content being less than a threshold level, project the identified at least one graphical interface on to the usable area of the identified surface; and
in response to the security setting of the content being greater than or equal to the threshold level, decline to project the identified at least one graphical interface on to the usable area of the identified surface.

16. The apparatus of claim 1, wherein the at least one graphical interface is further suitable to be projected on the usable area of the identified surface based on an amount of user attention the graphical interface involves and a user preference that designates content presented within the graphical interface is to be projected on the usable surface.

17. The apparatus of claim 16, wherein the designated content comprises at least one of calendar information, meeting information, toasts, email notifications, push notifications, and system updates.

18. A system, comprising:
a laptop computing device comprising a processor, a memory, a display device, an integrated camera, and a plurality of projectors integrated in the display device, wherein the memory stores code that is executable by the processor to:
track, via the integrated camera, a gaze of a user to identify where the user is looking relative to the laptop computing device;
using the tracked gaze to identify a surface around the laptop computing device where the user is looking and upon which the at least one of the integrated display device and the laptop computing device is positioned to determine an area of the identified surface for projecting, directly from the plurality of integrated projectors of the laptop computing device, at least one graphical interface of the computing device;
determine whether the at least one graphical interface is suitable for projection onto the area of the identified surface;
determine whether the area of the identified surface is suitable for hosting a functionality of the at least one graphical interface so that the user is able to interact and use the at least one graphical interface thereon;
in response to determining that the at least one graphical interface is suitable for projection onto the area of the identified surface and that the identified surface is suitable for hosting the user interactions with the at least one graphical interface and allows the user to interact and use the at least one graphical interface thereon, determine that the area is a usable area for the at least one graphical interface;
in response to determining that the area is the usable area for the at least one graphical interface, project an indication of the usable area onto the identified surface so that the user can visually see the usable area on the identified surface prior to the at least one graphical interface being projected thereon;
adjust the usable area on the identified surface in response to receiving an adjustment input from the user, wherein adjusting the usable area includes adjusting a visual size and functional size of the at least one graphical interface; and
project the at least one graphical interface on to the usable area of the identified surface in response to receiving an acceptance input from the user,
wherein the adjustment is performed subsequent to projecting the indication of the usable area onto the identified surface and prior to receiving the acceptance input from the user.

19. The system of claim 18, wherein the plurality of integrated projectors are automatically adjustable based on sensor data for projecting the at least one graphical interface on the usable area of the identified surface for use thereon.

20. A method, comprising:
tracking, by a processor, a gaze of a user to identify where the user is looking relative to an integrated display device of a laptop computing device;
using the tracked gaze to identifying a surface around at least one of the display device and the laptop computing device where the user is looking and upon which the at least one of the integrated display device and the laptop computing device is positioned to determine an area of the identified surface for projecting, directly from at least one projector integrated in the display device of the laptop computing device, at least one graphical interface of the laptop computing device;
determining whether the at least one graphical interface is suitable for projection onto the area of the identified surface;
determining whether the area of the identified surface is suitable for hosting a functionality of the at least one graphical interface so that the user is able to interact and use the at least one graphical interface thereon;
in response to determining that the at least one graphical interface is suitable for projection onto the area of the identified surface and that the identified surface is suitable for hosting the user interactions with the at least one graphical interface and allows the user to interact and use the at least one graphical interface thereon, determine that the area is a usable area for the at least one graphical interface;
in response to determining that the area is the usable area for the at least one graphical interface, projecting an indication of the usable area onto the identified surface so that the user can visually see the usable area on the identified surface prior to the at least one graphical interface being projected thereon;
adjusting the usable area on the identified surface in response to receiving an adjustment input from the user, wherein adjusting the usable area includes adjusting a visual size and functional size of the at least one graphical interface; and
projecting the at least one graphical interface on to the usable area of the identified surface in response to receiving an acceptance input from the user,
wherein the adjustment is performed subsequent to projecting the indication of the usable area onto the identified surface and prior to receiving the acceptance input from the user.

* * * * *